(12) United States Patent
Müller et al.

(10) Patent No.: US 11,905,935 B2
(45) Date of Patent: Feb. 20, 2024

(54) ACTUATOR ELEMENT AND METHOD FOR OPERATING AN ACTUATOR ELEMENT

(71) Applicant: rapitag GmbH, Munich (DE)

(72) Inventors: Sebastian Müller, Munich (DE); Alexander Schneider, Munich (DE)

(73) Assignee: rapitag GmbH, Munich (DE)

( * ) Notice: Subject to any disclaimer, the term of this patent is extended or adjusted under 35 U.S.C. 154(b) by 134 days.

(21) Appl. No.: 17/438,113

(22) PCT Filed: Mar. 4, 2020

(86) PCT No.: PCT/EP2020/055726
§ 371 (c)(1),
(2) Date: Sep. 10, 2021

(87) PCT Pub. No.: WO2020/200617
PCT Pub. Date: Oct. 8, 2020

(65) Prior Publication Data
US 2022/0252056 A1   Aug. 11, 2022

(30) Foreign Application Priority Data
Apr. 3, 2019 (DE) ............ 10 2019 204 782.3

(51) Int. Cl.
*F03G 7/06* (2006.01)

(52) U.S. Cl.
CPC ........... *F03G 7/0665* (2021.08); *F03G 7/062* (2021.08); *F03G 7/0616* (2021.08); *F03G 7/06143* (2021.08)

(58) Field of Classification Search
CPC ........ E05F 15/60; F03G 7/0665; F03G 7/062; F03G 7/0616; F03G 7/06143;
(Continued)

(56) References Cited
U.S. PATENT DOCUMENTS

| 8,966,893 B2 * | 3/2015 | Mance ................ F03G 7/065 60/527 |
| 2001/0011414 A1 * | 8/2001 | Antonio ............... F16K 31/025 29/605 |

(Continued)

FOREIGN PATENT DOCUMENTS

| EP | 3276285 A1 | 1/2018 |
| WO | 0133306 A2 | 5/2001 |

OTHER PUBLICATIONS

International Application No. PCT/EP2020/055726, International Search Report and Written Opinion, dated Jul. 29, 2020, 10 pages.

*Primary Examiner* — Shafiq Mian
(74) *Attorney, Agent, or Firm* — Kilpatrick Townsend & Stockton LLP (57) ABSTRACT

The invention relates to an actuator element (10), comprising an actuator (12), which comprises a shape memory alloy and is designed to shorten or extend itself in the longitudinal extension direction thereof when in an excited state; an electronic control unit, which has a carrier element (18) and a plurality of electronic components (26) for exciting the actuator (12) on the basis of a control signal; and a movable component (20), which is coupled to the actuator and is movable by means of the actuator (12) relative to the carrier element (18); wherein the carrier element (18) defines a guide portion (16), in particular a dimensionally stable guide portion, by means of which the actuator (12) is guided along the longitudinal extension direction thereof.

19 Claims, 6 Drawing Sheets

(58) Field of Classification Search
CPC ...... F16K 1/2007; F16K 31/025; F25D 21/08; F25C 5/22; F25C 2700/00; F25C 5/24; E05Y 2900/31
See application file for complete search history.

(56) References Cited

U.S. PATENT DOCUMENTS

| | | | | |
|---|---|---|---|---|
| 2011/0120118 A1* | 5/2011 | Alexander | ................ | F03G 7/06 60/527 |
| 2013/0160445 A1* | 6/2013 | Olson | ................ | F03G 7/065 60/527 |
| 2013/0227943 A1* | 9/2013 | Mance | ................ | F03G 7/065 427/256 |
| 2016/0102656 A1* | 4/2016 | Fujii | ................ | F16M 13/02 310/306 |
| 2018/0023875 A1* | 1/2018 | Marone | ................ | E05F 15/60 222/146.5 |

* cited by examiner

ACTUATOR ELEMENT AND METHOD FOR OPERATING AN ACTUATOR ELEMENT

CROSS REFERENCE TO RELATED APPLICATION

This application is a U.S. national phase of International Patent Application No. PCT/EP2020/055726 filed on Mar. 4, 2020, which claims priority to German Patent Application No. 10 2019 204 782.3, filed in Germany on Apr. 3, 2019. The entire contents of both applications are hereby incorporated herein by this reference.

The invention relates to an actuator element comprising an actuator which comprises a shape memory alloy and is designed to shorten or extend itself in the longitudinal extension direction thereof when in an excited state; an electronic control unit which has a carrier element and a plurality of electronic components for exciting the actuator on the basis of a control signal; and a movable component which is firmly arranged on a longitudinal end of the actuator and is movable by means of the actuator relative to the carrier element. The invention also relates to a method for operating such an actuator element.

Actuators are drive components that carry out a mechanical movement in response to a control signal. Actuators are, for example, electric motors consisting of a plurality of components, such as a conductor coil, a bearing and a shaft, which, however, require a large installation space and a comparatively high amount of energy is required for their operation. In addition, the conductor coil, which usually consists of a plurality of windings of copper wire, and low-wear materials for the further components are quite heavy. Electric motors are therefore not suitable for use in applications in which a light, compact and energy-saving design of the actuator is important.

In contrast, piezo actuators are relatively light and require a comparatively smaller installation space. In addition, hardly any moving components are required, which means that they have a long service life. However, it is disadvantageous that the actuating paths achievable with piezo actuators are, at 0.1% of the length of the actuator, very short, which greatly limits their applicability. Piezo actuators are used, for example, in acceleration sensors or pressure and force sensors as well as in microbalances.

An actuator can also be formed by means of a shape memory alloy (SMA). Shape memory alloys are specific metals that can exist in two different crystal structures. This is due to the phenomenon that they seem to be able to remember an earlier shape despite a subsequent strong deformation. Materials that have such an effect are also called cryogenic materials, which include, for example, nickel titanium, nitrol, and nickel titanium copper. The acquisition costs for an actuator containing a shape memory alloy are therefore comparatively low. Shape memory alloys are characterised by the fact that they can transmit very large forces in relation to their material volume and have an actuating path of approximately 5% of the length of the actuator, for example 5% of the length of a wire containing a shape memory alloy. In addition, shape memory alloys can go through several 100,000 motion cycles without showing signs of fatigue, i.e. they have a long service life. Furthermore, materials containing shape memory alloys only take up a small amount of installation space and are comparatively low in weight. The shape change can be stimulated by increasing the temperature or by electrical excitation. The energy supply required for said shape change is therefore relatively low.

However, it is disadvantageous that in the case of an actuator design comprising a shape memory alloy, by means of which an actuating path that can be used for mechanical applications, for example in the millimetre range, is intended to be achieved, the actuator must have a relatively large length, and therefore devices that use such actuators require a correspondingly large installation space. When using a wire made from a shape memory alloy, a wire with a length of, for example, approximately 10 cm is required for such an application. Alternatively, it is known to form a shape memory wire into a spring. However, this is many times more expensive than a straight wire and further limits the scope of application due to the shape.

Therefore, the problem addressed by the present invention is that of providing an actuator element which requires little installation space and, depending on the length of wire used, allows for a variable actuating path.

According to the invention, the problem is solved in that the carrier element defines a guide portion, in particular a dimensionally stable guide portion, by means of which the actuator is guided along the longitudinal extension direction thereof such that the actuator runs on a winding path.

The operating principle of the actuator element according to the invention can be described as follows: The actuator can be excited on the basis of the control signal, whereby the shape memory alloy and thus the actuator can transition to the excited state and the actuator can shorten or extend itself in the longitudinal extension thereof. The movable component is mechanically coupled or connected to the actuator, so that the change in length of the actuator moves the movable component along an actuating path. During the movement of the actuator, i.e. when it is shortened or extended, the actuator is guided along its longitudinal extension by means of the guide portion. In other words, the actuator can slide along the guide portion while being simultaneously guided thereby. Preferably, the guide portion does not substantially allow the actuator to move in the direction orthogonal to its longitudinal extension. In other words, the guide portion keeps the actuator on its path.

The configuration of the path of the actuator according to the invention makes it possible to overall reduce the installation space of the actuator element considerably. Therefore, measured along the path, the actuator can have a relatively large longitudinal extension in order to achieve the desired actuating path of the movable component, while the actuator element itself can have an overall size in all spatial directions that is smaller than the longitudinal extension of the actuator. This is achieved in that the actuator runs according to the invention, i.e. it has at least one turn, and a reliable guiding of the actuator in accordance with the path provided for the actuator is provided by means of the guide portion.

In one embodiment of the invention, the actuator can run at least partially around an edge of the carrier element, so that the carrier element can advantageously assume a double function as a guide portion and as a support for components or as a mechanical structural part.

In a further embodiment of the invention, the actuator can run within the carrier element on a winding path, preferably a path with at least two turns. In this embodiment, a particularly reliable and protected guiding of the actuator within a channel in the interior of the carrier element can be achieved.

In a further embodiment of the invention, the actuator can be deflected on the carrier element, preferably above or below the carrier element, by at least one deflection element, for example a deflection roller or a deflection pin. In this embodiment, the carrier element is used for guiding the actuator and the at least one deflection element allows the path of the actuator to be adapted using simple means and largely independently of the design of the carrier element.

The wire can be guided in a loop-shaped manner on the movable component or through the movable component, while the two longitudinal ends of the actuator are fastened to the carrier element. This allows for a simple contacting of the actuator at its longitudinal ends on the carrier element.

In an alternative variant, it is proposed that a first longitudinal end of the actuator is fastened to the movable component and a second longitudinal end of the actuator is fastened to the carrier element. In this way, the change in length of the actuator is completely converted into an actuating path of the movable component and the achievable actuating path is thus maximised. The fastening can be formed by a stop, so that only a pulling movement between the actuator and the movable component is blocked beyond the stop, but a pushing movement is possible or, vice versa, a pushing movement between the actuator and the moving component is blocked, while a pulling movement is possible. Corresponding variants come into consideration for the fastening between the actuator and the carrier element, i.e. a stop between the actuator and the carrier element can be provided as well.

In a further embodiment of the invention, at least one longitudinal end of the actuator can be connected to the carrier element or to the movable component via an adjustable coupling which allows a distance between the longitudinal end and the carrier element or between the longitudinal end and the movable component to be adjusted. In this way, the length of the actuator and/or the tension of the actuator can be adjusted.

The actuator element is preferably structured as a closed system which can be used modularly in different applications as a universal lock, such as in a securing element, e.g. the anti-theft device described in utility model 20 2019 101 192. In general, the actuator element can also be used in a lock which is released by pulling back a closure element, or in a water valve in which a water flow is released after a closure element is pulled back. There are also fields of application in the automotive industry, for example for closing doors or windows.

According to a preferred embodiment, the carrier element can be a circuit board. In this way, the installation space of the actuator element can be further reduced, since the electrical control unit preferably already contains a circuit board which can also accommodate the plurality of electronic components. In addition, a circuit board usually consists of an insulating material, for example fibre-reinforced plastic or hard paper, which makes it insensitive to heat and only conducts electricity at desired, previously defined points. As a result, such a circuit board does not require any further material adjustments when the actuator is excited by means of heat or electricity. Furthermore, the circuit board materials have good sliding properties, which means that the actuator can slide very well along the guide portion of the carrier element in the event of a change in state, for example during the transition to the excited state and an associated shortening or extending of the actuator. In particular, it is thus intended that the actuator is guided on an edge of the circuit board and around the circuit board. Furthermore, the usually very flat shape of a circuit board is advantageous for achieving the desired small installation space.

According to the invention, the movable component moves relative to the carrier element when the actuator is transferred to the excited state. For this purpose, one longitudinal end of the actuator is firmly connected to the movable component. This connection can be a soldered connection which, however, has the disadvantage that the high temperatures during the soldering process can change the material properties of the shape memory alloy. For this reason, it is preferred that the movable component consists of a part in which the actuator is clamped, screwed or inserted (for example by means of a screw terminal). Two interconnected subcomponents, between which the longitudinal end of the actuator can be held, constitute an improvement. For this purpose, the longitudinal end of the actuator can comprise a retaining element which is wedged between the subcomponents. The retaining element can be a bulge of the actuator, a crimp or a hook. This also has the advantage that assembly is faster and therefore more cost-effective.

The same advantages are provided if the carrier element preferably comprises two plates which bear against one another, wherein the other longitudinal end of the actuator not connected to the movable component is held between the plates. For this purpose, this longitudinal end of the actuator can comprise a retaining element, as described above.

The subcomponents of the movable component and/or the plates of the carrier element can be connected by means of gluing, screwing or soldering, wherein the subcomponents can also be plates. The connection is preferably established such that surfaces of the plates and/or subcomponents bear against one another.

A particularly energy-saving excitation of the actuator can be achieved, for example, in that the actuator can be put into the excited state by means of a supply of current and one of the electronic components provides a power supply for the actuator, wherein in particular the movable component is connected to the carrier element such that a closed circuit is present between the longitudinal ends of the actuator and the power supply both in the excited and in the non-excited state of the actuator. By supplying current, the actuator is heated and transferred to the excited state. Alternatively or additionally, a heating coil can be used for heating, which is preferably included in the electronic control unit.

The movable component preferably engages with the carrier element. In this way, the movable component can be guided while it is being moved. One possible configuration is a slide rail or a tongue and groove connection between the movable component and the carrier element. Alternatively, the movable component can be rotatably held relative to the carrier element, for example rotatably mounted on the carrier element.

In a preferred embodiment, an engagement region can be present between the movable component and the carrier element, in which the carrier element and the movable component engage with one another. In this engagement region, a contact region can be present which allows for a power transmission between the power supply and the actuator independently of the positioning of the movable component relative to the carrier element. For example, a contact surface on the movable component can be connected in an electrically conductive manner to the longitudinal end of the actuator connected to the movable component and a contact surface of the carrier element can be electrically connected to the power supply, wherein the contact surfaces bear against one another and can form the contact region. In this way, the electronic control unit can have a particularly compact design, since additional conductor cables for contacting the movable component can be omitted.

An even more compact design of the actuator element can be achieved in that the carrier element has a recess in which the movable component can be at least partially accommodated.

In a preferred embodiment, the movable component is designed to carry out a linear movement or a rotary movement. This embodiment makes it possible, for example, to design the movable component as a bolt, a latching hook, a rotary arm, sheet metal or a slide. The movable component itself can also comprise a circuit board. When the actuator element is used in a securing element, the movable component can be part of a locking mechanism.

It is desirable that, in a state in which the actuator is not excited, the movable component is in a defined position, for example a rest position. This can preferably be achieved in that the movable component is pretensioned into a rest position by means of a pretensioning element and the actuator is designed to move the movable component against the pretensioning force of the pretensioning element. This means that, when the actuator is not shortened/extended, i.e. it is not in an excited state, the movable component is moved into the rest position. The pretensioning element can be a spring or a magnet arrangement that exerts a force on the movable component which can be opposite to the force that the actuator exerts on the movable component in the excited state. Depending on the design, the movable component can be pushed or pulled into the rest position.

It goes without saying that the actuator can have different shapes as long as it has the longitudinal extension provided according to the invention. A preferred embodiment of the actuator is a wire made from a shape memory alloy. The carrier element can be square, round, or oval. The shape can be based on the intended application of the actuator element. Furthermore, a round or oval shape can be advantageous if the actuator runs around the carrier element because friction at corner regions can thus be avoided.

In the following, the configuration of the actuator element will be described, in which the actuator runs around the carrier element on the edge of the carrier element, preferably directly on said edge. The installation space of the actuator element can already be reduced if the actuator runs at least once around the carrier element. It goes without saying that the reduction in installation space can be further improved if the actuator runs around the carrier element twice, better still three times. The guide portion can define the path along which the actuator runs.

If the actuator is wrapped around the carrier element several times, the windings can also run unevenly and leave out a region in which the movable component can move. It is particularly preferred that, when the actuator runs around the carrier element, the guide portion for the actuator defined by the carrier element is formed on an edge surface of the carrier element. In this way, the carrier element can have a very flat shape, which reduces the overall height of the actuator element. The guide portion itself can be a depression, for example a channel, which can be milled into the carrier element, for example. The design of the guide portion as a channel can be advantageous, since it allows the actuator to be guided along the longitudinal extension of the actuator. A simpler design of the guide element can be achieved by means of a guide with guide pins or deflection rollers which can define the path of the actuator.

In order to improve the sliding properties of the guide portion, the guide portion can have a surface structure with depressions and elevations. For example, a corrugated or nubby structure can be used, such as the structure of a golf ball. In this way, the area of contact between the guide portion and the actuator can be reduced.

It goes without saying that a reduction of the area of contact between the actuator and the carrier element reduces the frictional forces occurring between them. In a preferred embodiment, the actuator therefore only bears against the corners of the carrier element, wherein these corners are preferably rounded.

In the following, the alternative embodiment of the actuator element will be described, in which the actuator runs within the carrier element on a winding path with at least one turn, preferably with a plurality of turns. In this case, the path preferably has the shape of a spiral or a meander or some other shape which has at least one, preferably a plurality of turns.

The turns of the actuator make it possible for the actuator to be accommodated in the actuator element in a compact manner. The turns can have any shape or angle, but a uniform shape, for example the shape of the spiral or the meander, is preferred in order to avoid unnecessary stresses in the actuator.

In the event that the carrier element consists of two plates bearing against one another, the guide portion can be designed such that it extends at least partially, preferably predominantly, between the plates bearing against one another. In this case, the guide portion can be present in one plate or both plates can be designed to be complementary and together form the guide portion. The advantage of the design as a circuit board is the insulating effect against electricity and heat during guiding and also the possibility of contacting the longitudinal end of the actuator to activate it. As already explained above with regard to the guide portion, its surface structure can be designed with elevations and depressions, for example have a corrugated or nubby structure, for example the structure of a golf ball. The guide portion, for example in the form of a channel, can also be milled into the carrier element. The guide portion can define the path along which the actuator runs.

For good utilisation of the entire change in length of the actuator, it is desirable that the actuator can move freely along the guide portion. This means that the actuator can preferably slide along the guide portion with as little friction as possible and/or there is preferably no firm connection between the actuator and the guide portion, namely the guide portion preferably designed as a channel.

In the following, the electronic control unit will be described in more detail, wherein the following statements refer to both alternatives of the course of the actuator.

It is preferred that the plurality of electronic components comprises a signal receiving unit which is designed to cause the actuator to be excited when an excitation signal is received, wherein the signal receiving unit is preferably designed to receive a wireless signal. The signal receiving unit can therefore receive a signal, preferably a wireless signal, and process it such that the actuator transitions to the excited state on the basis of the control signal. If the excitation takes place via the supply of current, the power supply is preferably activated in response to the excitation signal being received by the signal receiving unit.

Wireless signals that can be received, for example by the signal receiving unit, can be transmitted using digital technologies such as digital radio signals, Bluetooth®, RFID, near field communication (NFC), LoRaWAN, NB-IoT or via analogue data transmission, such as analogue radio signals, light pulses, data transmission via sounds or movement impulses. The "Bluetooth Low Energy" (BLE) transmission technology, for example, requires particularly little energy.

Each module preferably has a unique identification number that allows for a clear assignment. In this way, it can be prevented, for example, that a plurality of actuators of different actuator elements, which are located in the receiving range of the excitation signal, are unintentionally excited at the same time. An excitation directed specifically at one actuator element can thus take place.

A signal received by the signal receiving unit, for example an excitation signal to excite the actuator, can be an encrypted signal.

The control can take place, for example, by means of a mobile terminal, for example by means of a smartphone, a smart watch, a tablet or other device that has a corresponding signal transmission unit.

It is also possible that the actuator element, for example the electronic control unit thereof, comprises a display unit, for example a display or LEDs. This can be advantageous if the control takes place via a mobile terminal which does not have an integrated display unit. Additionally or alternatively, the actuator element can comprise an energy storage unit, for example a storage battery, an energy harvesting unit or a connection to the power grid, which is designed to supply the electronic control unit with energy.

According to a preferred embodiment, the display unit and/or the energy storage unit can be part of, or be connected to, the electronic control unit. An integration of the display unit and/or the energy storage unit in the actuator element can allow for a compact structure and the use of the actuator element as a closed system which can easily be used in different systems.

The storage battery can be a commercially available battery, for example a button cell. It is also preferred that the battery is rechargeable, for example inductively rechargeable. The energy harvesting unit can be a solar module or an induction antenna to extract and store the smallest amounts of freely available energy from the environment. For this purpose, the trickle charging of a storage device, preferably a capacitor or super capacitor, is required. The stored charge is used to supply the shape memory alloy with energy.

In general, shape memory alloys are very energy efficient, and therefore the energy storage unit can be kept relatively small when compared to the use of other actuators.

Further electronic components that can be included in the control unit are at least one LED and/or a loudspeaker and/or a sensor for measuring an active/passive circuit and/or a light sensor and/or a motion sensor.

According to a second aspect, the present invention provides a method for operating an actuator element according to the first aspect of the invention, wherein the method comprises the following steps: receiving a signal which preferably contains an encrypted token, preferably decrypting the token, and exciting the actuator element.

It must be mentioned at this point that, in this description and in the claims, excitation of the actuator can in particular refer to electrical excitation by applying a predetermined voltage to the actuator and/or by generating or inducing a predetermined current flow through the actuator, wherein the electrical excitation can take place in particular for a predetermined period of time. These parameters of the electrical excitation (voltage, current, excitation duration) can be determined according to the specific actuator used.

The actuator element of the second aspect of the invention can be used as a remotely controllable actuating module which is actuated in response to an electrical, in particular wirelessly transmitted, actuating signal and carries out an actuating movement. A token enables integration into a system with a plurality of actuator elements and/or a plurality of transceivers. If an encrypted token is used, undesired or unauthorised actuation of the actuator element can be prevented.

In a preferred embodiment of the invention, the method of the second aspect further comprises the following steps:
    establishing a wireless connection between the actuator element and a transceiver arranged remotely therefrom,
    generating a token, preferably an encrypted token and/or a token for one-time use,
    preferably transmitting a signal with an identification code that uniquely identifies the actuator element from the actuator element to the transceiver,
    transmitting the token from the transceiver to the actuator element,
    preferably decrypting the token,
    exciting the actuator element for moving the movable component, and
    preferably outputting an optical and/or an acoustic and/or a haptic signal.

The use of a unique identification code for an actuator element allows, for example, the addressing of different actuator elements by the same transceiver.

Preferably, in a method of the second aspect of the invention, it is also provided that, after initiating the excitation process, the electronics are triggered to emit optical and/or acoustic and/or haptic feedback, wherein, depending on the operating state of the actuator element, different optical and/or acoustic and/or haptic signals are output, and/or that the success or failure of the excitation of the actuator and/or the movement of the movable component is detected, processed and optically and/or acoustically and/or haptically reproduced via electronic sensors and/or a signal indicating the success or failure is transmitted to the receiving device, wherein the electronic sensors comprise a proximity sensor and/or a position indication sensor, for example a Hall probe, which is suitable for determining the position of the movable component, thus providing information about the success or failure of the excitation of the actuator. With such configurations, the method can provide a user with feedback on the operation and function of the actuator element.

In the following, the invention will be explained in more detail using the accompanying drawings, in which.

Figure 1A:
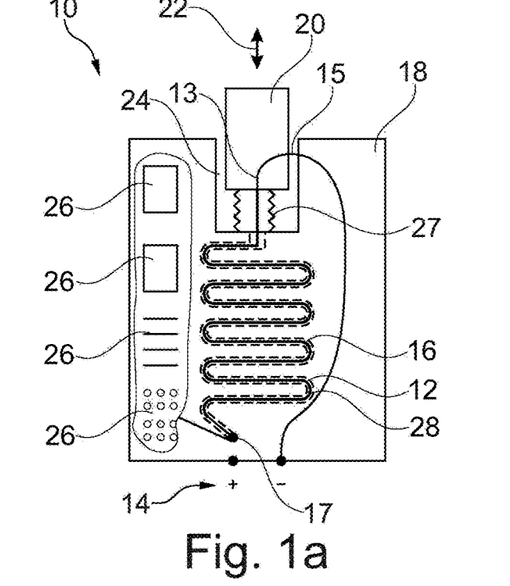
FIG. 1*a* shows an actuator element according to a first embodiment of the present invention.

In FIG. 1a, an actuator element according to a first embodiment of the invention is generally denoted with 10 and comprises an actuator 12 which is formed at least in portions from a shape memory alloy and designed to shorten itself when the actuator 12 is excited correspondingly. A generally known shape memory alloy (SMA) can be used, i.e. an alloy which has a martensite crystal structure at a temperature below a transition temperature and an austenite crystal structure at a temperature above the transition temperature, wherein the geometries of the crystal structures in the two phases differ significantly from one another, so that there are noticeable changes in length above or below the transition temperature, particularly in the case of elongate bodies, such as wires, formed from a shape memory alloy. Examples of shape memory alloys that can be used for the present invention are cryogenic materials, NiTi (nickel titanium, nitinol), NiTiCu (nickel titanium copper), other nickel-titanium alloys, for example with Co, Cr, Fe or Nb, CuZn (copper zinc), CuZnAl (copper zinc aluminium) and CuAlNi (copper aluminium nickel).

The actuator 12 can be excited by applying a voltage via a power supply 14, whereby a current flow is generated in the actuator 12 and, due to the ohmic resistance of the actuator 12, the actuator 12 is heated to a temperature above the transition temperature of the shape memory alloy. The actuator 12 is formed in particular as a wire.

The actuator 12 is guided along the longitudinal extension direction thereof in a guide portion 16 which, in the first embodiment, can be formed in a carrier element 18. In particular, the guide portion 16 can be a channel which is designed as a recess or hollow space in the carrier element 18 in a dimensionally stable manner. The actuator 12 can then slide along the guide portion 16, wherein the guide portion 16 defines a path along which the actuator 12 runs.

The actuator 12 is firmly connected at its one longitudinal end 13 to a movable component 20. The movable component 20 is preferably designed to carry out a linear movement, illustrated by an arrow 22, relative to the carrier element 18. Alternatively, the component 20 can carry out a rotary movement or be guided on any other movement path suitable for the respective actuating process.

The carrier element 18 is preferably part of an electronic control unit and carries a plurality of electronic components 26, such as the power supply 14 for exciting the actuator 12 on the basis of a control signal. On the basis of a control signal, the electronic components 26 therefore initiate a supply of current to the actuator 12 which then transitions to its excited state and shortens itself. In this case, the actuator 12 can slide along the guide portion 16. While the longitudinal end 13 is firmly connected to the movable component 20, the opposite longitudinal end 17 is firmly connected to the carrier element 18. If the actuator 12 shortens itself due to an excitation, it can slide along the guide portion 16 and thus move the movable component 20, i.e., in the embodiment, it is pulled towards the carrier element 18. For guiding the movement of the movable component 20, the carrier element has a recess 24 into which the movable component 20 can be pulled.

If the actuator 12 leaves its excited state, for example, when the supply of current is terminated, the actuator 12 transitions to its non-excited state in which it is extended in relation to the excited state. As a result of this extension, the movable component 20 can again move in the opposite direction relative to the carrier element 18, i.e. away from the carrier element 18. The movement in this direction is supported by a pretensioning element 27, for example a spring or magnet arrangement. The pretensioning element 27 can in particular be a compression spring which is supported on the carrier element 18 and on the movable element 20, so that the spring force of the pretensioning element 27 has to be overcome when the actuator 12 is excited. The position in which the movable component 20 is located when the actuator 12 is not excited is referred to in the following as the rest position.

The carrier element 18 is preferably designed as a plate or a housing and, in addition to guiding the actuator 12, assumes a further function in the mechanical structure of the actuator element 10, for example as a carrier surface for the electronic components 26. Particularly preferably, the carrier element 18 is a circuit board, i.e. a printed circuit board on which a plurality of conductor tracks, e.g. conductor tracks made of etched copper, are arranged and on which the electronic components 26 are mechanically held and electrically contacted, in particular soldered to soldering surfaces or solder lands of the circuit board. The fibre-reinforced plastic customary for circuit boards is preferably used as the material for the circuit board.

Figure 2A:
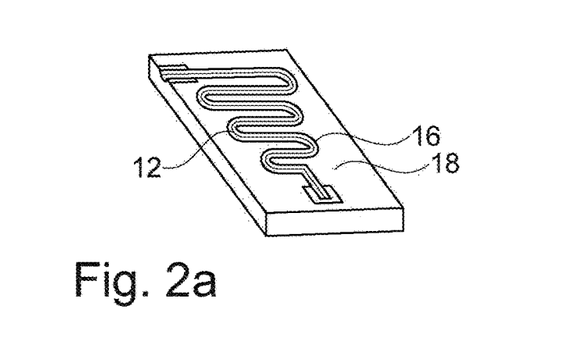
FIG. 2*a* shows depictions of configurations of a guide portion in variants of the first embodiment.

FIG. 2a show views which explain the structure of the guide portion 16 of the first embodiment in variants. The guide portion 16 is preferably formed in the interior of the carrier element 18. For this purpose, the carrier element 18 can be constructed from two plates 30, 32 joined together in a planar manner, in the surface of which a groove corresponding to the course of the guide portion 16 is formed, wherein the plates 30, 32 are joined together such that the grooves of the plates 30, 32 lie one above the other in a fitting manner and thus form a closed channel between them as a guide portion 16 in which the actuator 12 can be accommodated. Alternatively, only one of the two plates 30, 32 could have a groove along the guide portion 16, while the other of the two plates 30, 32 only covers the groove in a planar manner. The plates can be glued, screwed or fastened to one another in a planar manner in some other way.

By appropriately designing the groove, the course of the guide portion 16 can be defined such that the actuator 12 extends therein along a winding path 28. In other words, the winding path 28 follows the course of the channel of the guide portion 16. The perspective view in FIG. 2a illustrates a variant for a path of which the course deviates from the course of the path 28 in FIG. 1a. In any case, however, the path defines at least one turn or change of direction, preferably a plurality of turns, for example in the form of a meander. Thus, a relatively large length of the actuator 12 can be accommodated in a compact manner on the carrier element 18, so that, in relation to the size of the carrier element 18, a relatively large difference in length of the actuator 12 between the excited state and the non-excited state and thus a relatively large actuating path of the movable element 20 can be achieved.

Figure 1B:
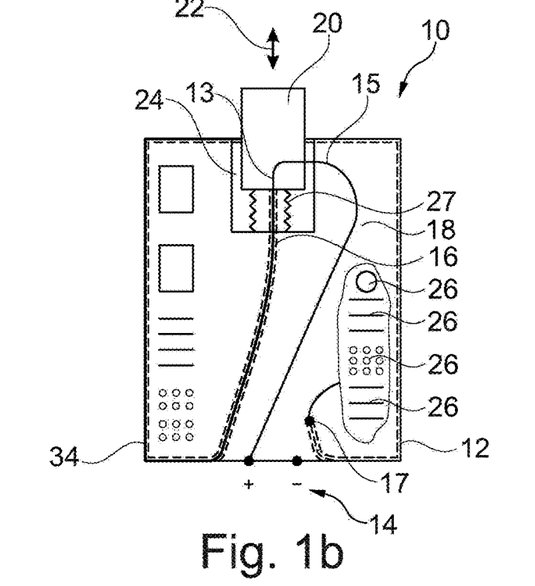
FIG. 1*b* shows an actuator element according to a second embodiment of the present invention.

FIG. 1b shows an actuator element 10 according to a second embodiment of the present invention. In the following, only the differences from the first embodiment will be described and reference is otherwise made to the description of the first embodiment. The same or corresponding features are denoted with the same reference signs as in the first embodiment.

In contrast to the first embodiment, an actuator 12 of the second embodiment is guided on a guide portion 16 which is located on an edge 34, in particular a peripheral edge, of a carrier element 18. In other words, the actuator 12 in the second embodiment is guided along the edge 34 of and around the carrier element 18 at least along part of the periphery of the carrier element 18.

Figure 2B:
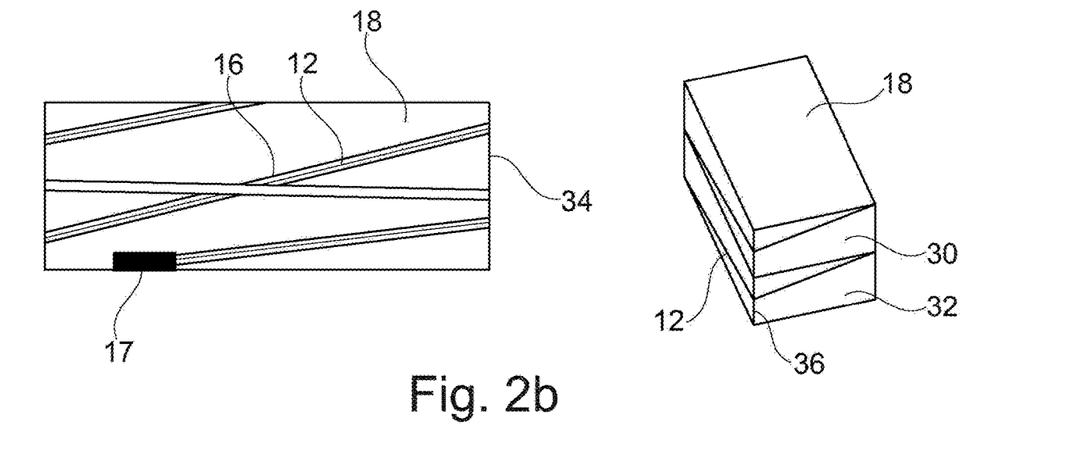
FIG. 2*b* shows depictions of configurations of a guide portion of a variant of the second embodiment.

For example, the carrier element 18 can have an approximately rectangular base region, so that the actuator 12 is guided around at least one corner of the rectangle, preferably wound around a plurality of corners and longitudinal sides of the carrier element 18. As can be seen in FIG. 2b, the actuator 12 is particularly preferably wound several times around the entire periphery of the carrier element 18, i.e. it has a plurality of rectangular windings, comparable to coil windings. Of course, the carrier element 18 can have a different base region, for example the shape of another polygon or a round shape, for example a circular shape. For the effect of the invention, it is only essential that the course of the actuator 12 in this embodiment also deviates at least in portions from a purely straight shape along the longitudinal extension direction thereof.

A guide portion 16 is preferably provided on the edge 34 of the carrier element 18 such that the actuator 12 is reliably guided in the guide portion 16 along a defined path and in particular cannot shift transversely to the longitudinal extension direction, i.e. transversely to the path. The guide portion can have the shape of a channel-like depression or use other guide elements to guide the actuator.

Figure 4A:
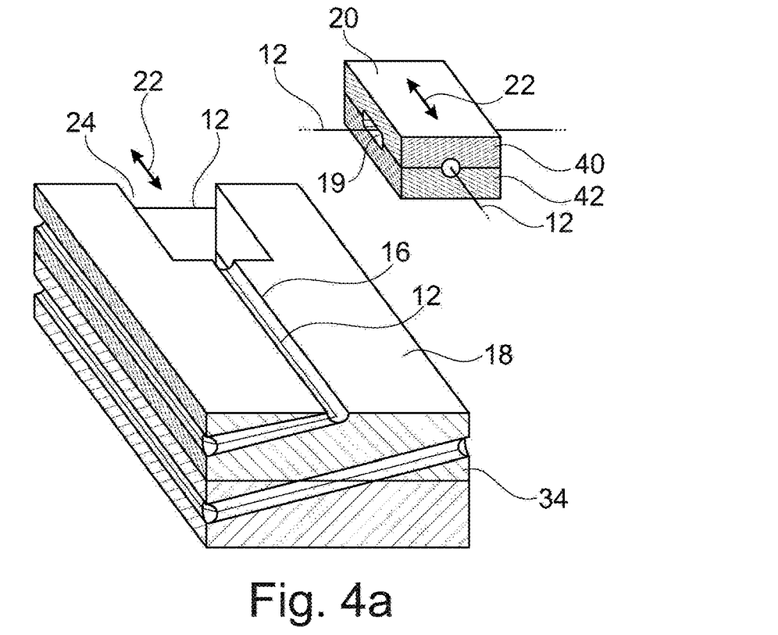
FIG. 4*a* shows perspective views of a carrier element and a movable component of an actuator element according to a fourth embodiment of the present invention.

If the actuator 12 according to the second embodiment is wound around the outer edge 34 of the carrier element 18, the actuator 12 also crosses the region in which the movable component 20 is located. Here, the course of the actuator 12 is selected by a corresponding design of the guide portion 16 such that it passes the movable component undisturbed. In FIG. 1b, for example, the actuator 12 runs below the movable component 20. Alternatively, the actuator can penetrate a through-opening of the movable component 20, for example indicated as a through-opening 19 in FIG. 4a, provided that the through-opening is large enough in the movement direction of the movable component 20 that the movable component can move undisturbed.

If the actuator 12 is guided around corners 36 of the carrier element 18, increased friction between the actuator 12 and the carrier element 18 can be generated at these parts of the guide portion 16. In order to reduce said friction, the corners 36 can be rounded. A particularly low-friction variant is illustrated as a third embodiment of the invention in FIGS. 3a to 3c. Here, a carrier element 18 has greatly rounded deflecting portions 36 in its corner regions, around which an actuator 12 is deflected. Notches 37 are also provided between the deflecting portions 36, so that the actuator 12 is freely guided between the deflecting portions 36 substantially without contact with the carrier element 18 and, therefore, no friction at all occurs at these portions.

Figure 3A:
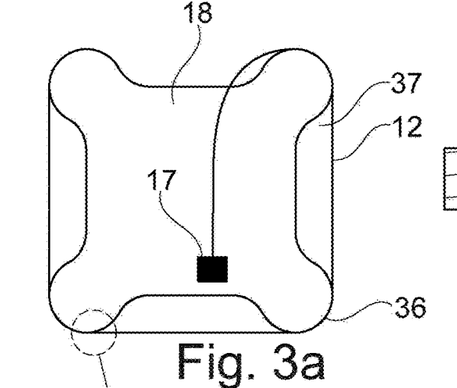
FIG. 3*a* is a plan view of a carrier element of an actuator element according to a third embodiment of the present invention.
Figure 3B:
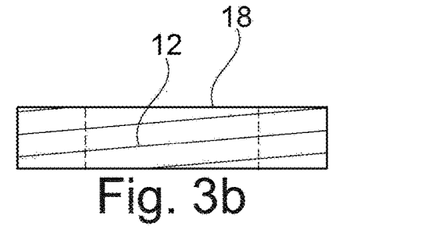
FIG. 3*b* is a side view of the carrier element of the third embodiment.
Figure 3C:
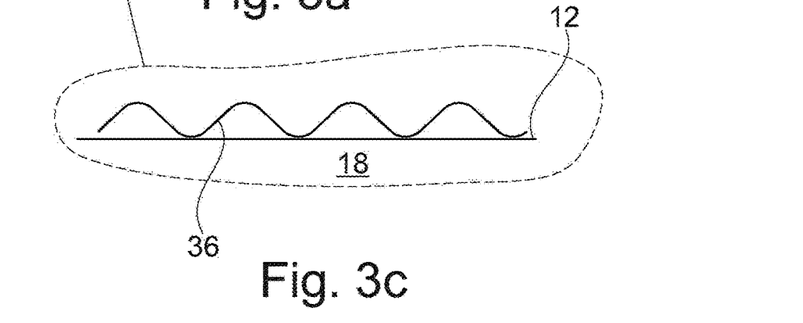
FIG. 3*c* shows an enlarged detail from FIG. 3*a*.

In addition, FIG. 3c illustrates in an enlarged detail a special surface of the deflecting portions 36, by means of which the friction at the deflecting portions 36 can be additionally reduced in that the surface has a profiled structure of depressions and elevations, e.g. similar to the surface of a golf ball.

A variant for fastening a longitudinal end 17 of an actuator 12 to the carrier element 18 is also illustrated in FIGS. 2b and 3a. In particular, the longitudinal end 17 of the actuator 12 can have an enlarged head which can be produced, for example, by means of a brim. The enlarged head can then be inserted interlockingly into a correspondingly enlarged recess of the carrier element 18, so that it cannot be pulled into a channel of the guide portion 16 and thus a tensile force of the actuator 12 can be transmitted during excitation. A similar connection can be provided between the other longitudinal end 13 of the actuator 12 and the movable component 20.

Figures 4B, 4C:
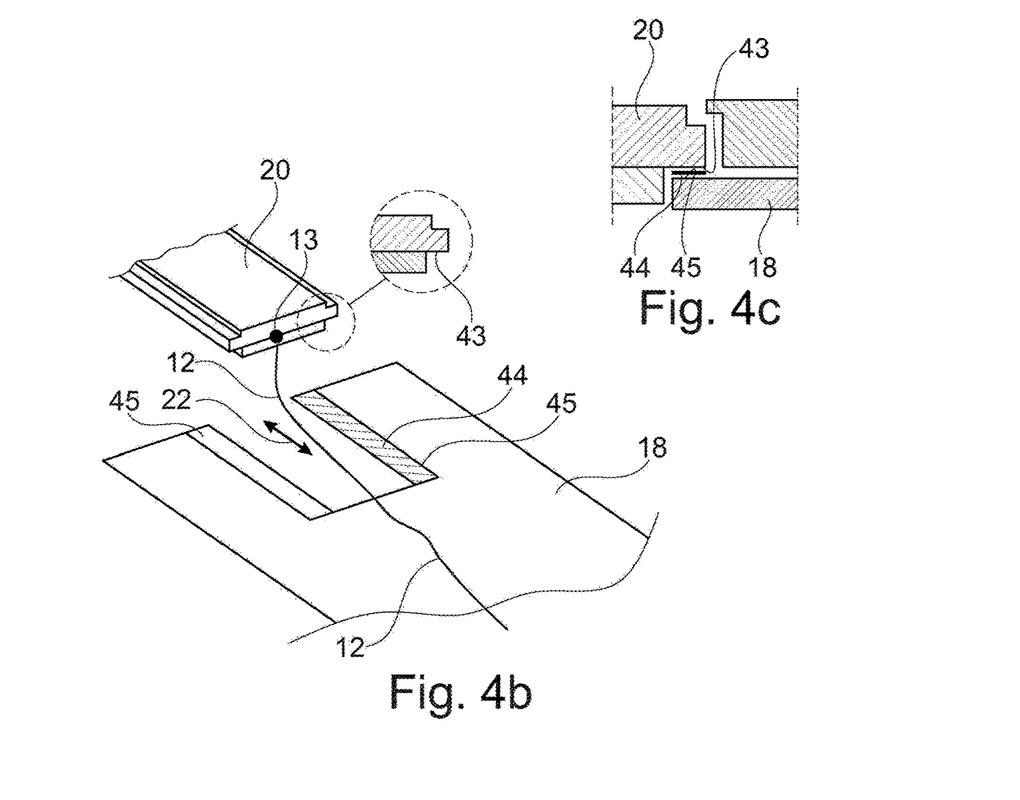
FIG. 4*b* shows perspective views of a carrier element and a movable component of an actuator element according to a fifth embodiment of the present invention.
FIG. 4*c* is a cross-sectional view of an engagement portion between the carrier element and the movable component of the fifth embodiment.
Figure 4D:
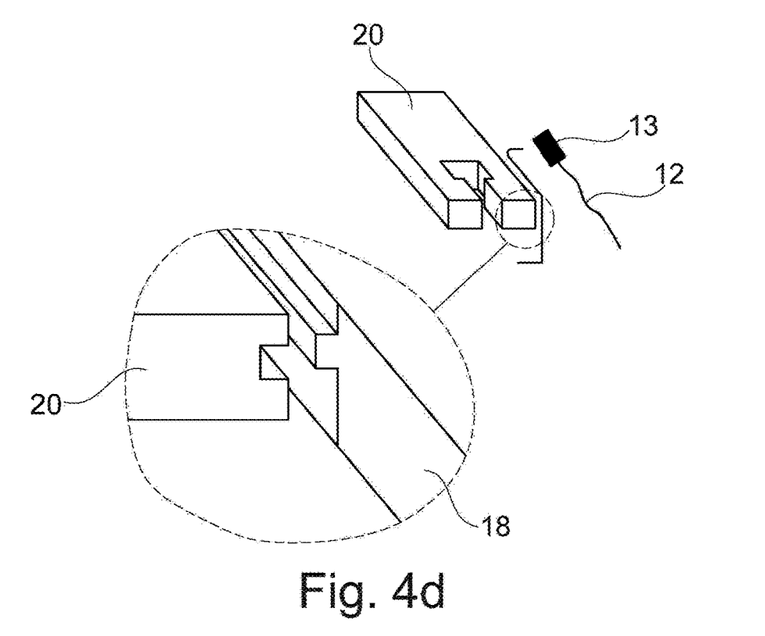
FIG. 4d is a perspective view of a movable component and an adjoining portion of a carrier element for an actuator element according to a sixth embodiment of the present invention.

FIG. 4a shows a fourth embodiment of the present invention, FIGS. 4b and 4c show a fifth embodiment of the present invention, and FIG. 4d shows a sixth embodiment of the present invention. In the following, only the differences between these embodiments and the preceding embodiments will be described. Features and elements that are the same or correspond to the preceding embodiments are denoted with the same reference signs and will not be described again. For this purpose, express reference is made to the description of the first, second, or third embodiment.

The fourth, fifth and sixth embodiments each relate to configurations of a connection and electrical contacting between a movable component 20 and a carrier element 18. In the fourth embodiment according to FIG. 4a, a carrier element 18 has a recess 24 comparable to the first embodiment, in which the movable component 20 can at least partially be accommodated such that it can move linearly in the region of the recess 24 along the directions indicated by an arrow 22. A longitudinal end (cf. longitudinal end 13 of the first embodiment) of the actuator 12 can be fastened to the movable component 20, for example by accommodating an enlarged head end in a corresponding depression. In the illustrated embodiment, the movable component 20 can be constructed from two components 40, 42 which bear against one another and enclose the longitudinal end of the actuator 12 between them.

In order to excite the actuator 12, it must be electrically contacted such that a current flow through the actuator 12 is made possible. For this purpose, in a simple variant schematically illustrated in the first and second embodiment, the longitudinal end 13 of the actuator 12 (or a portion of the movable component 20 electrically connected thereto) fastened to the movable component 20 can be connected by means of a free conductor 15, for example a simple wire, to a corresponding contact on the carrier element 18 (in the first embodiment with the negative pole, in the second embodiment with the positive pole of the power supply 14). In this case, the length of the free conductor 15 is dimensioned such that it can flexibly absorb the actuating movement of the movable component 20 over the entire actuating path.

In the fifth embodiment, however, the contact is not made via a free wire but via a sliding contact 44 between the carrier element 18 and the movable component 20. In particular, the movable component 20 can be designed as a slide which has a contact rail 43 in the region of the sliding contact 44, which is electrically connected to the longitudinal end 13 of the actuator 12. A corresponding slide rail 45 of the carrier element 18 is then in sliding contact with the slide rail 43 of the movable component 20 over the entire actuating path of the movable component 20. The contact rail 45 of the carrier element 18 is in turn connected to the electrical components 26 or the power supply 14 of the carrier plate 18. If the carrier element 18 is designed as a circuit board, the contact rail can be designed in a particularly simple manner as a conductor track on the circuit board.

The sliding contacts and the contact rails described above not only ensure electrical contact, but also define a linear guide for the movable component 20. Such a linear guide is additionally improved in the sixth embodiment of the invention by a tongue and groove connection between the movable component and the carrier element 18, wherein the contact region (sliding contact) can be provided within the tongue and groove connection. In other words, a first contact rail can be provided on the groove and a second contact rail can be provided on the tongue. In FIG. 4*d*, for example, the carrier element 18 has the tongue, while the groove is formed on the movable component 20. Of course, the groove can also be provided on the carrier element 18 and engage with a tongue of the movable component.

Figure 5A:
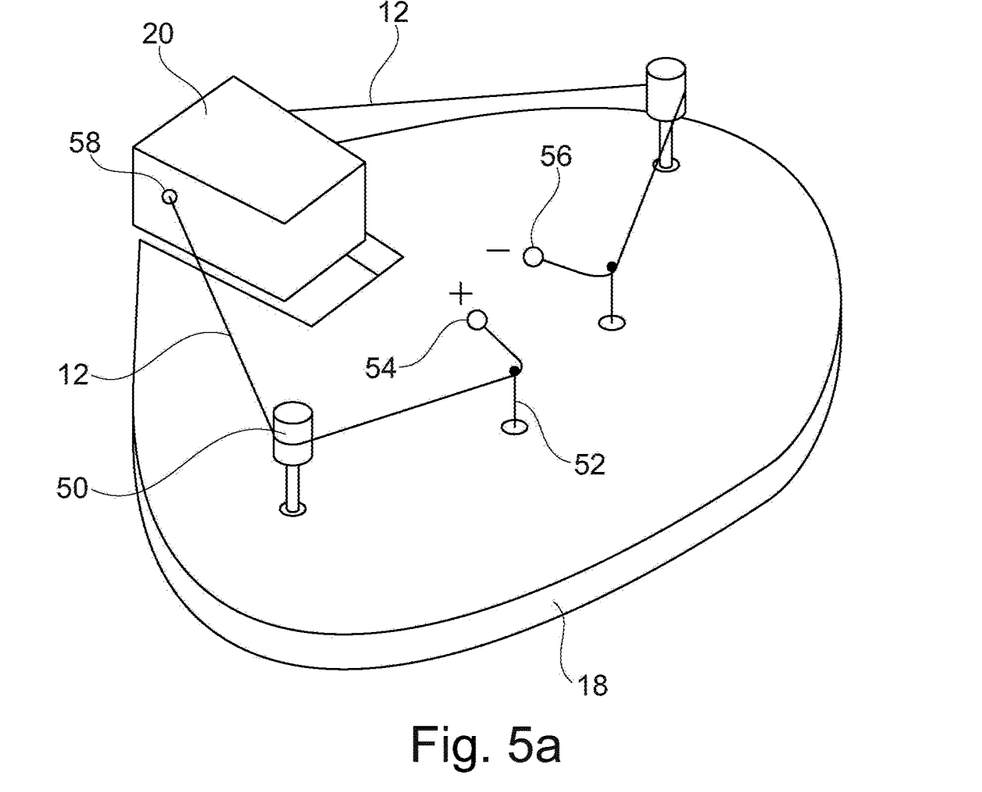
FIG. 5a is a perspective view of an actuator element according to a seventh embodiment of the present invention.

FIG. 5*a* shows a seventh embodiment of the present invention. In the following, only the differences from the previous embodiments will be described in more detail.

Features and elements that have already been described in the same or a corresponding manner for previous embodiments are denoted with the same reference signs and will not be described again. For this purpose, express reference is made to the description of the preceding embodiments.

In an actuator element of the seventh embodiment, an actuator 12 is guided along a non-linear path on an upper side of a carrier element 18. In this case, deflection rollers 50 and/or deflection pins 52, which are attached to the upper side of the carrier element 18, so that they guide the actuator 12 at a distance parallel to the surface of the carrier element 18, serve as guide elements 16. Depending on the desired path, a plurality of deflection rollers 50 and/or a plurality of deflection pins 52 can be provided at suitable positions. The deflection rollers 50 and/or deflection pins 52 can equally be used as independent features for deflecting the actuator 12 in the previously described embodiments or in all other embodiments of the invention.

The seventh embodiment also illustrates an alternative variant for securely fastening the longitudinal ends of the actuator 12. It can be seen that both longitudinal ends 54, 56 of the actuator 12 are each securely fastened to the carrier element 18, while a central portion of the actuator 12 is coupled to the movable component 20. For example, the central portion can be guided through an opening 58 on the movable component 20. The actuator 12 can be freely movable within the opening 58. Such a variant has the advantage that it is easier to fasten the longitudinal ends 54, 56 and to make contact with the longitudinal ends 54, 56 for producing the excitation circuit. However, it is disadvantageous that a maximum actuating path of the movable component 20 is reduced by a factor of 2.

Figure 5B:
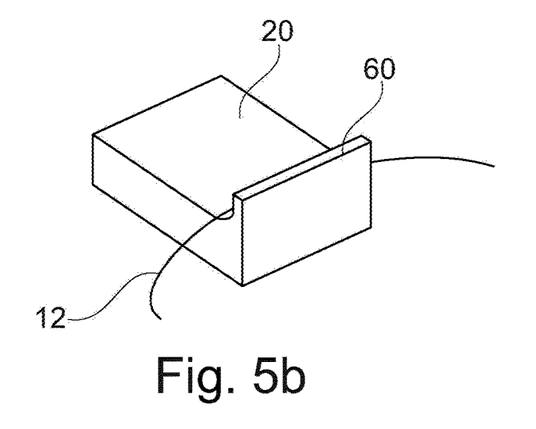
FIG. 5b is a perspective view of a movable component of an actuator according to a variant of the seventh embodiment of the present invention.

FIG. 5*b* shows a variant of the seventh embodiment, in particular a variant of a movable component 20 of the seventh embodiment, in which the actuator 12 is not guided through an opening 58 through the movable component 20 but is hooked onto a hook portion 60.

In all of the illustrated embodiments, the electronic components 26 can comprise switching devices for a wireless activation of the actuator element. For example, the electronic control unit can have a signal receiving unit which can receive signals via a generally known radio standard, for example a Bluetooth receiving unit. The electronic control unit can then be designed to excite the actuator 12, for example to activate the power supply 14, in response to a control signal.

The electronic components can also comprise a storage device for storing data. In addition, the electronic control unit preferably has a signal transmission unit which, for example, can wirelessly transmit signals relating to an operating state of the actuator element 10 to a remote receiving device. The signal transmission unit can also be designed to have a locating function in order to locate the actuator element 10.

Furthermore, the actuator element 10 can comprise an energy storage device, for example a storage battery, or it can be designed to be connected to an energy storage device. The energy storage device can supply the electronic components 26 or the electronic control unit with energy. The energy storage device is preferably rechargeable.

An energy requirement of the actuator element 10 can be reduced if the electronic control unit further comprises a motion sensor as an electronic component 26, which can selectively switch the electronic components 26 to an active or an inactive operating mode on the basis of the signals received from the acceleration sensor. A position indication sensor, preferably a Hall probe, can additionally detect the status of the excitation of the actuator via the position of the movable component. The electronic control unit can transmit said status to the operator via the status indication device or the display. Transmission to the mobile receiving device of the operator is also possible in order to indicate the success of the excitation or potential errors.

Furthermore, the electronic control unit could comprise a status indication device, preferably an LED light source or an output for an acoustic signal, which can indicate, for example, the state of the actuator 12. If the electronic control unit comprises an energy storage device, for example a storage battery, the status indication device could also output an indication of the state of charge of the energy storage device.

The actuator element 10 can be used, for example, as an anti-theft device. In this case, a lock of the anti-theft device could be opened by means of the excitation of the actuator 12 and the associated movement of the movable element 20.

The actuator element 10 can furthermore comprise an alarm generating device, for example as an electrical component 26, which is designed to emit an acoustic and/or visual alarm signal in response to an attempt to move the movable component 20 without authorisation. The alarm generating device can only be active when the movable component 20 is in its rest position. If the actuator element 10 is used as an anti-theft device, it can protect against unauthorised removal of the anti-theft device, for example from an item of clothing.

Figure 6:
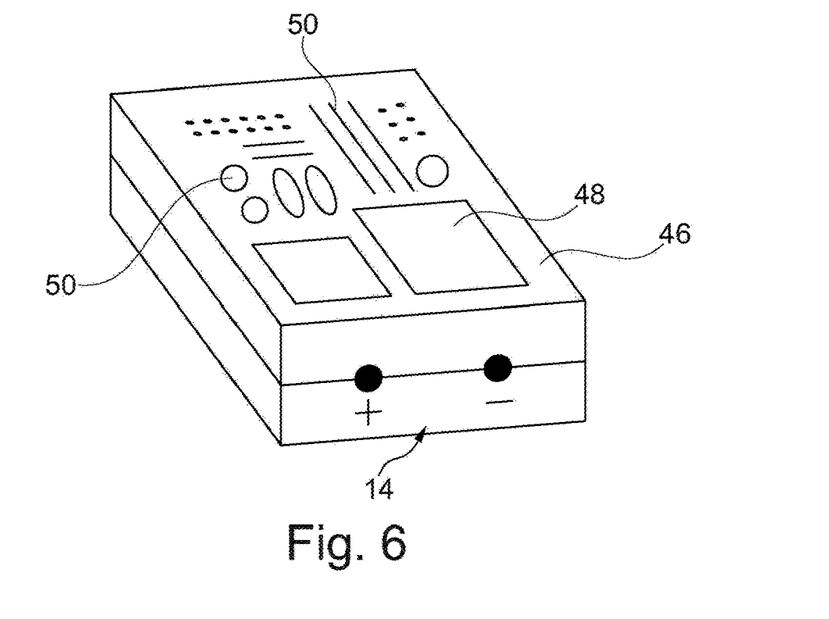
FIG. 6 is a perspective view of an actuator element according to an eighth embodiment of the present invention.

In an eighth embodiment of the present invention illustrated in FIG. 6, an actuator element further comprises a housing 46 in which the most important components of the invention, in particular, for example, the components described above in connection with embodiments one to seven, i.e. an electronic control unit, a carrier element, an actuator, and a movable component, are accommodated. The housing 46 may have a recess (not shown) in order to transmit a movement of the movable component 20 to an external element outside the housing 46. For example, the movable component 20 can be guided at least partially out of the housing 46 through the recess. The housing 46 can have a connection for the power supply 14, for example for connecting an external power supply or a charger. An energy storage unit can be arranged in the housing 46 or outside thereof.

The housing 46 can comprise a housing display unit 48 connected to at least one of the plurality of electronic components in the interior of the housing. The housing display unit can be designed similarly to the aforementioned display unit. Furthermore, the housing 46 can be transparent or have a recess which enables the user to read the display unit as part of the electronic control unit.

In the same way, the aforementioned electronic components (see, for example, FIGS. 1a and 1b, components 26), for example an LED and/or a loudspeaker and/or a cutting sensor and/or a light sensor and/or a motion sensor and/or the status indication device and/or the output for an acoustic signal, can be connected to operating elements 50 and/or display elements 48 on the housing 46.

Figure 7:
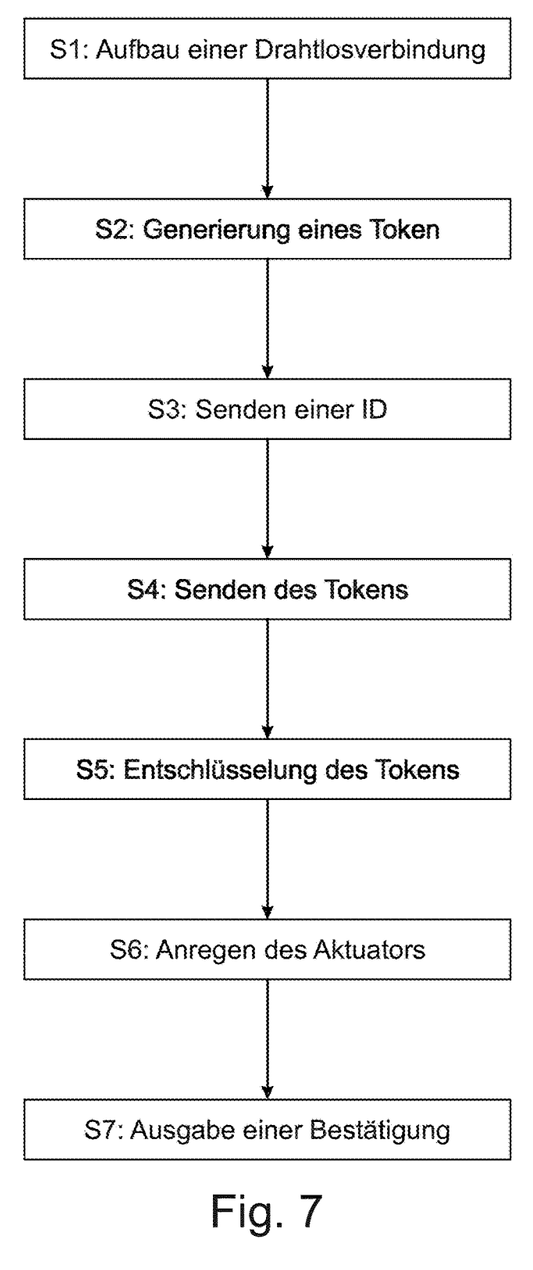
FIG. 7 is a flowchart for a method for operating an actuator element according to an embodiment of the present invention.

FIG. 7 shows a method for operating an actuator element according to an embodiment of the present invention. For using an actuator element according to the first to eighth embodiment, the method can be executed together with a mobile terminal, for example a smartphone of a user. Parts of the method, in particular for encrypting or decrypting, for receiving or transmitting or for exciting the actuator, are advantageously stored directly in one of the electronic components in the electronic control unit of the actuator element, for example in the form of embedded software.

In a first step S1 of the method, a wireless connection is established between the actuator element and the mobile terminal, for example using the Bluetooth protocol. In a second step S2, a token or security code is generated, which is intended to prevent unauthorised or accidental communication with the actuator element. The token can be encrypted with a security standard corresponding to the application.

In a further step S3 of the method, the actuator element transmits a signal with an identification code that uniquely identifies the actuator element to the actuator element. The identification code uniquely identifies a specific actuator element, so that it is ensured that, among a plurality of actuator elements, only one specific actuator element is addressed. The mobile terminal can alternatively receive the identification code assigned to an actuator element in any other suitable manner, for example by manually entering an identifier displayed on the actuator element, by transmission from a server to the mobile terminal, or the like.

In a further step S4, the encrypted token is transmitted from the mobile terminal to the actuator element, whereupon the token is decrypted in the actuator element in step S5. If the decryption was successful, the method proceeds to step S6 in which the actuator is excited, for example by switching on the power supply. As a result, a movement of the movable component is finally carried out and a desired actuating process is executed.

Successful actuation of the actuator element, for example a movement of the movable component, can be detected by suitable sensors. If successful, a confirmation message is output in step S7, for example by outputting an acoustic confirmation signal. In the event of an error, an error signal can alternatively be output, for example by a corresponding acoustic warning signal.

The invention claimed is:

1. Method for operating an actuator element for moving a movable component on the basis of a control signal, the actuator element comprising:
an actuator which comprises a shape memory alloy and is designed to shorten or extend itself in the longitudinal extension direction thereof when in an excited state;
an electronic control unit, which has a carrier element and a plurality of electronic components for exciting the actuator on the basis of a control signal; and
the movable component which is coupled to the actuator and is movable by means of the actuator relative to the carrier element,
wherein the carrier element defines a dimensionally stable guide portion by means of which the actuator is guided along the longitudinal extension direction thereof such that the actuator runs on a winding path,
the method comprising the steps of:
establishing a wireless connection between the actuator element and a transceiver arranged remotely therefrom;
generating an encrypted token and/or a token for one-time user;
transmitting a signal with a unique identification code assigned to the actuator element from the actuator element to the transceiver;
transmitting the token from the transceiver to the actuator element;
decrypting the token;
exciting the actuator element for moving the movable component; and
outputting an optical and/or an acoustic and/or a haptic signal.

2. Method according to claim 1, wherein the actuator runs at least partially around an edge of the carrier element.

3. Method according to claim 1, wherein the actuator runs within the carrier element on a winding path.

4. Method according to claim 1, wherein the actuator is deflected on the carrier element by at least one deflection element.

5. Method according to claim 1, wherein the carrier element is a circuit board.

6. Method according to claim 1, wherein the actuator can be put into the excited state by means of a supply of current and one of the electronic components provides a power supply for the actuator, wherein the movable component is connected to the carrier element such that a closed circuit can be established between the longitudinal ends of the actuator and the power supply.

7. Method according to claim 1, wherein both longitudinal ends of the actuator are firmly arranged on the carrier element and a central portion of the actuator is coupled to the movable component.

8. Method according to claim 1, wherein a first longitudinal end of the actuator is fastened to the movable component and a second longitudinal end of the actuator is fastened to the carrier element.

9. Method according to claim 1, wherein at least one longitudinal end of the actuator is connected to the carrier element or to the movable component via an adjustable coupling which allows a distance between the longitudinal end and the carrier element or between the longitudinal end and the movable component to be adjusted.

10. Method according to claim 1, wherein the movable component engages with the carrier element.

11. Method according to claim 1, wherein the movable component is designed to carry out a linear movement or a rotary movement.

12. Method according to claim 1, wherein the movable component is pretensioned into a rest position by means of a pretensioning element and the actuator is designed to move, the movable component against the pretensioning force of the pretensioning element.

13. Method according to claim 1, wherein the actuator runs around the carrier element and the guide portion defined by the carrier element for the actuator is formed on an outer edge surface of the carrier element.

14. Method according to claim 13, wherein the actuator only bears against corner regions of the carrier element, wherein these corners are rounded to form deflecting portions.

15. Method according to claim 1, wherein the actuator runs within the carrier element on the winding path and the path has turns, wherein the path is designed in the shape of a spiral or a meander or another shape that is non-linear at least in portions.

16. Method according to claim 1, wherein the actuator can move freely along the guide portion but is prevented by the guide portion from moving transversely to the longitudinal extension direction of the actuator.

17. Method according to claim 1, wherein the plurality of electronic components comprises a signal receiving unit which is designed to cause the actuator to be excited when an excitation signal is received, wherein the signal receiving unit is designed to receive a wireless signal.

18. Method according to claim 1, wherein the electronic control unit has at least one element from the following list:
- a display unit;
- an acoustic component;
- an electronic component for generating haptic feedback;
- a proximity sensor or a position indication sensor, which is suitable for determining the position of the movable component, thus providing information about the success or failure of the excitation of the actuator;
- an energy storage unit, which is designed to supply the electronic control unit with energy.

19. Method according to claim 1, wherein:

after initiating the excitation process, the electronics are triggered to emit optical and/or acoustic and/or haptic feedback, wherein, depending on the operating state of the actuator element, different optical and/or acoustic and/or haptic signals are output; and/or the success or failure of the excitation of the actuator and/or the movement of the movable component is detected, processed and optically and/or acoustically and/or haptically reproduced via electronic sensors and/or a signal indicating the success or failure is transmitted to the receiving device, wherein the electronic sensors comprise a proximity sensor and/or a position indication sensor, which is suitable for determining the position of the movable component, thus providing information about the success or failure of the excitation of the actuator.

* * * * *